(12) United States Patent
Yang et al.

(10) Patent No.: US 7,914,671 B2
(45) Date of Patent: *Mar. 29, 2011

(54) APPARATUS FOR REMOVING BUOYANT POLLUTANTS

(75) Inventors: Ming-Lu Yang, Taipei Hsien (TW); Wei-Guo Yang, Shenzhen (CN); Zheng-Hong Chi, Shenzhen (CN); Yu-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 462 days.

This patent is subject to a terminal disclaimer.

(21) Appl. No.: 12/107,777

(22) Filed: Apr. 23, 2008

(65) Prior Publication Data
US 2009/0145822 A1    Jun. 11, 2009

(30) Foreign Application Priority Data

Dec. 7, 2007  (CN) .......................... 2007 1 0202924

(51) Int. Cl.
*C02F 1/40* (2006.01)
(52) U.S. Cl. .................. 210/115; 210/170.05; 210/242.3
(58) Field of Classification Search .................. 210/112, 210/115, 170.05, 170.09, 170.11, 242.3
See application file for complete search history.

(56) References Cited

U.S. PATENT DOCUMENTS

| | | | | |
|---|---|---|---|---|
| 3,537,587 A | * | 11/1970 | Kain .......................... | 210/242.3 |
| 4,626,358 A | * | 12/1986 | Fetsko .......................... | 210/776 |
| 6,129,839 A | | 10/2000 | Mains, Jr. | |
| 6,572,765 B2 | * | 6/2003 | Lincke ..................... | 210/167.12 |
| 7,445,719 B2 | * | 11/2008 | Lundback et al. ............ | 210/741 |

FOREIGN PATENT DOCUMENTS

| | | |
|---|---|---|
| CN | 101066788 A | 11/2007 |
| TW | 442617 | 6/2001 |
| TW | 547212 | 8/2003 |

OTHER PUBLICATIONS

English Translation of CN 101066788, published Nov. 2007.*

* cited by examiner

*Primary Examiner* — Terry K Cecil
(74) *Attorney, Agent, or Firm* — Frank R. Niranjan

(57) ABSTRACT

An exemplary apparatus (10), for removing buoyant pollutants having oil and debris atop a body of coolant, includes a pollutant collecting device (11), a pump (12) and a controlling module (13). The pollutant collecting device includes a hollow tub (12) and a collecting module (113). The collecting module is partially received in the hollow tub and is slidable relative to the hollow tub. The pump communicates with the hollow tub. The controlling module is configured for controlling the pump to draw coolant, oil or a mixture of coolant and buoyant pollutants into the hollow tub or out of the hollow tub.

13 Claims, 4 Drawing Sheets

APPARATUS FOR REMOVING BUOYANT POLLUTANTS

BACKGROUND OF THE INVENTION

1. Field of the Invention

The present invention generally relates to apparatuses for removing buoyant pollutants, and more particularly, to an apparatus for removing buoyant pollutants having oil and debris atop a body of coolant.

2. Discussion of the Related Art

In order to prevent overheating of cutting tools, a coolant is generally applied to the cutting tool to cool it. However, when using the cutting tool, pollutants, such as oil, and debris, such as dust and other particles, may contaminate the coolant in a coolant tank. The oil generally floats atop the coolant. Some of the debris will mix with the coolant, some debris will sink to the bottom of the coolant, and some debris will mix with the oil and float atop the coolant. Because the majority of coolants for cutting tools are viscous, most of the debris will mix with the oil and float atop the coolant.

The coolant tank for receiving the coolant is generally badly ventilated. In a badly ventilated environment, contamination of the coolant will increase and because most of the pollutants are buoyant this creates a haven for micro-organisms and the micro-organisms further contaminate the coolant. When the contaminated coolant is applied to the cutting tool, the cutting tool erodes and deteriorates, resulting in poor quality work-pieces machined by the cutting tool. In addition, the contaminated coolant may also be a health hazard. Therefore, the coolant must be changed periodically to prevent contamination. Changing the coolant increases costs and takes time, thus decreasing the work efficiency.

In order to extend the usage life of the coolant, the buoyant pollutants such as oil and debris floating atop a body of the coolant should be removed by an apparatus. There are mainly four typical kinds of apparatuses for removing buoyant pollutants from the coolant: a rubber-strip-type apparatus, a metal-strip-type apparatus, a swob-type apparatus, and a whirlpool-type apparatus. The rubber-strip-type apparatus includes a rubber strip for absorbing buoyant pollutants. The rubber-strip-type apparatus is stable for removing buoyant pollutants, but the usage life of the rubber strip is short and the efficiency is relatively low. The metal-strip-type apparatus includes a metallic strip for removing buoyant pollutants. The usage life of the metallic strip is relatively long, but the efficiency of the metallic strip is also relatively low. The swob-type apparatus includes a swob for absorbing buoyant pollutants. The efficiency of the swob-type apparatus is high, but the swob is easily damaged when there are a lot of impurities in the coolant. The whirlpool-type apparatus has a high efficiency, and also has a relative long usage life, but the whirlpool-type apparatus is easily clogged by impurities collected from the coolant.

Therefore, an apparatus that is less likely to be clogged by impurities and has high efficiency for removing buoyant pollutants, and to be stable over the long term, is desired.

SUMMARY

An apparatus, for removing buoyant pollutants having oil and debris atop a body of coolant, includes a pollutant collecting device, a bi-directional pump, and a controlling module. The pollutant collecting device includes a hollow tub and a collecting module. The collecting module is partially received in the hollow tub and is slidable relative to the hollow tub. The bi-directional pump communicates with the hollow tub. The controlling module is configured for controlling the bi-directional pump to draw coolant, oil or a mixture of coolant and buoyant pollutants into the hollow tub or out of the hollow tub.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present apparatus for removing buoyant pollutants atop a body of coolant. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present apparatus in detail.

Figure 1:
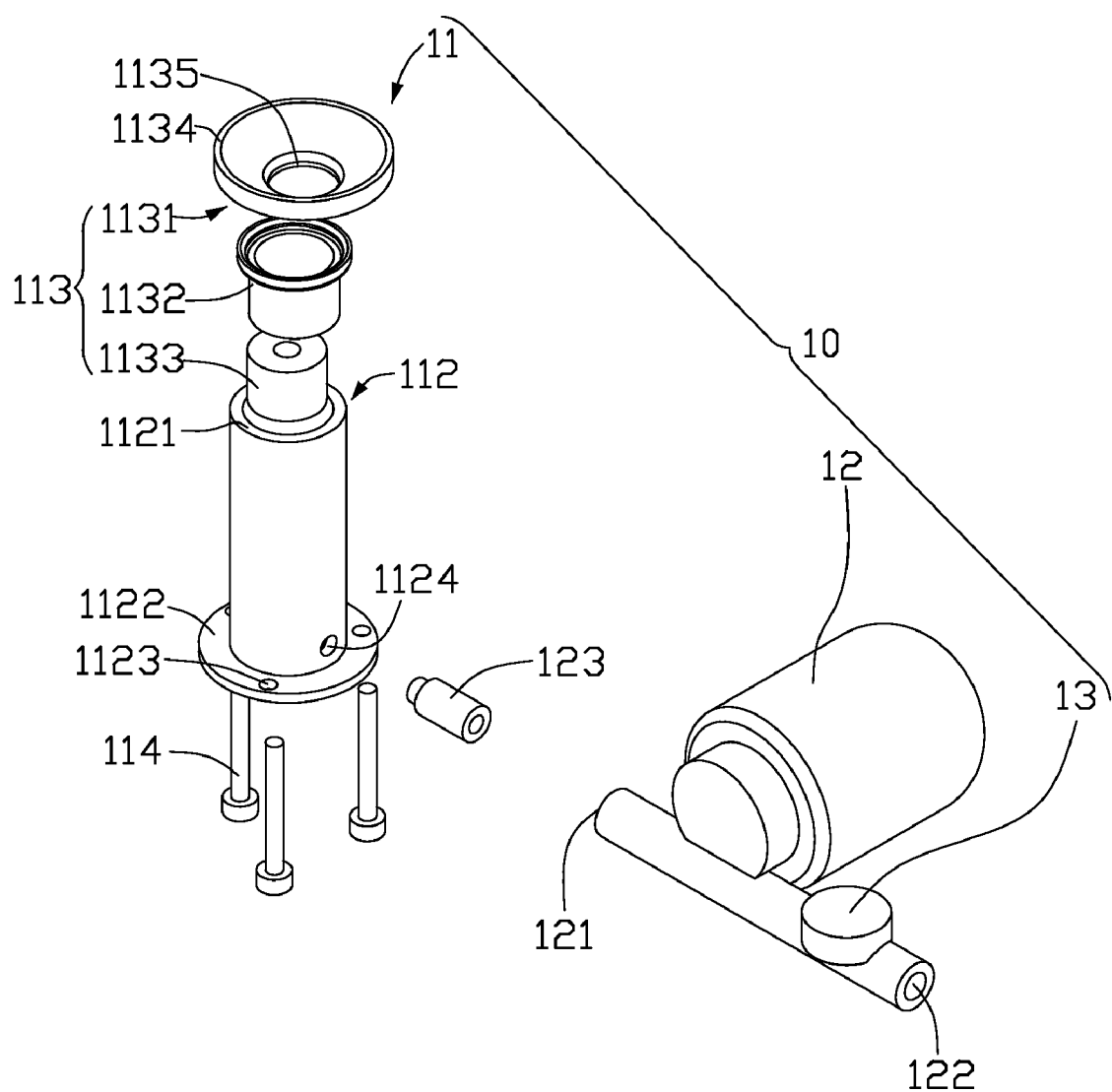
FIG. 1 is an exploded, isometric view of an apparatus for removing buoyant pollutants atop a body of coolant in accordance with an embodiment of the present invention.
Figure 2:
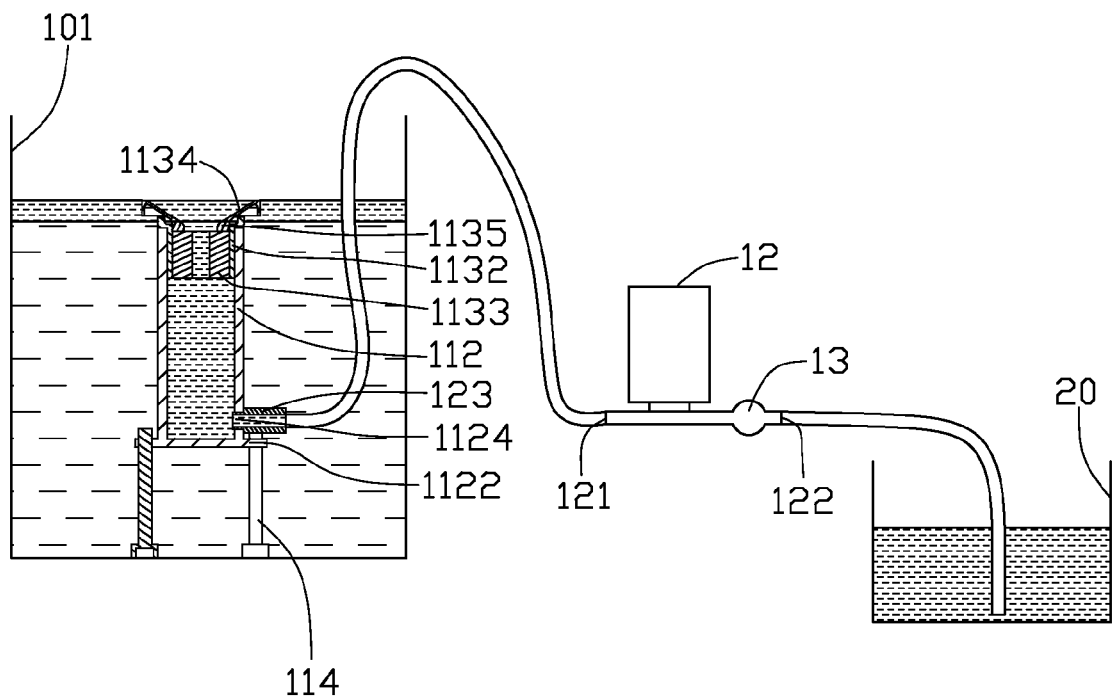
FIG. 2 is a cross-sectional, using view of the apparatus of FIG. 1.

Referring to FIGS. 1 and 2, an apparatus 10 for removing buoyant pollutants such as oil and debris floating atop a body of a coolant in accordance with a preferred embodiment is shown. The apparatus 10 includes a pollutant collecting device 11, a bi-directional pump 12, and a controlling module 13. The pollutant collecting device 11 is connected to the bi-directional pump 12. The controlling module 13 is configured for controlling the bi-directional pump 12 to propel a liquid such as coolant, oil, or a mixture of coolant and buoyant pollutants in a first direction or in a second direction opposite to the first direction.

The pollutant collecting device 11 includes a hollow tub 112, a collecting module 113, and three adjusting members 114. The collecting module 113 is partially received in the hollow tub 112 and is slidable relative to the hollow tub 112.

The hollow tub 112 includes a main portion 1121 and a platform base 1122 connected to one end of the main portion 1121. The platform base 1122 defines a plurality of threaded holes 1123. The number of the threaded holes 1123 is preferably three. The main portion 1121 is cylindrical and defines a through hole 1124 adjacent to the platform base 1122.

The collecting module 113 includes a skimming member 1131, a skimmer supporting cup 1132, and a floating platform 1133. The skimming member 1131 is a funnel-shaped member including a skimming portion 1134 and a mounting portion 1135 connected to the skimming portion 1134. The mounting portion 1135 of the skimming member 1131 is attached in a top cavity defines in a top end of the skimmer supporting cup 1132. The skimmer supporting cup 1132 is substantially cylindrical. The floating platform 1133 is a hollow cylinder made of a solid buoyancy material (SBM) such as foam polystyrene, and so on. The floating platform 1133 is received in a bottom cavity defined in a bottom end of the skimmer supporting cup 1132. The floating platform 1133 is able to float in the hollow tube 112 when the hollow tube 112 is filled with liquid, thereby supporting the skimmer supporting cup 1132 that is supporting the skimming member 1131.

The adjusting members 114 are screws. The adjusting members 114 are configured to engage in the threaded holes 1123 of the platform base 1122 so that a height of the apparatus 10 can be adjusted.

It should be pointed out that, the skimming member 1131 and the skimmer supporting cup 1132 can be integrally made. The skimmer supporting cup 1132 and the floating platform 1133 are not limited to cylindrical, they can also be other shapes, such as quadrangular prism.

The pollutant collecting device 11 is placed in a coolant tank 101 of a cutting machine (not shown). Because the floating platform 1133 is made of solid buoyancy material, thus the skimming member 1131 floats in a body of a liquid having oil and/or coolant in the tub 112 thus vertically displacing the skimming member 1131. The skimming portion 1134 of the skimming member 1131 is preferably displaced to a position below the interface between the oil and the coolant. In addition, because the collecting module 113 is slidable relative to the hollow tub 112, thus a position of the collecting module 113 can be adjusted. Therefore, the apparatus 10 has high efficiency for removing buoyant pollutants such as oil and debris floating atop the body of the coolant.

The bi-directional pump 12 is a solenoid pump. The bi-directional pump 12 includes an input portion and output portion communicating with the input portion. The input portion defines an input hole 121 and the output portion defines an output hole 122. The input hole 121 is connected to the through hole 1124 of the hollow tub 112 by a flexible tube (not labeled). The output hole 122 is connected to a container 20 by another flexible tube (not labeled). The pump 12 propels the liquid in the first direction in a pollutant removing state. The flexible tube connects to the through hole 1124 with a fixing member 123.

Figure 3:
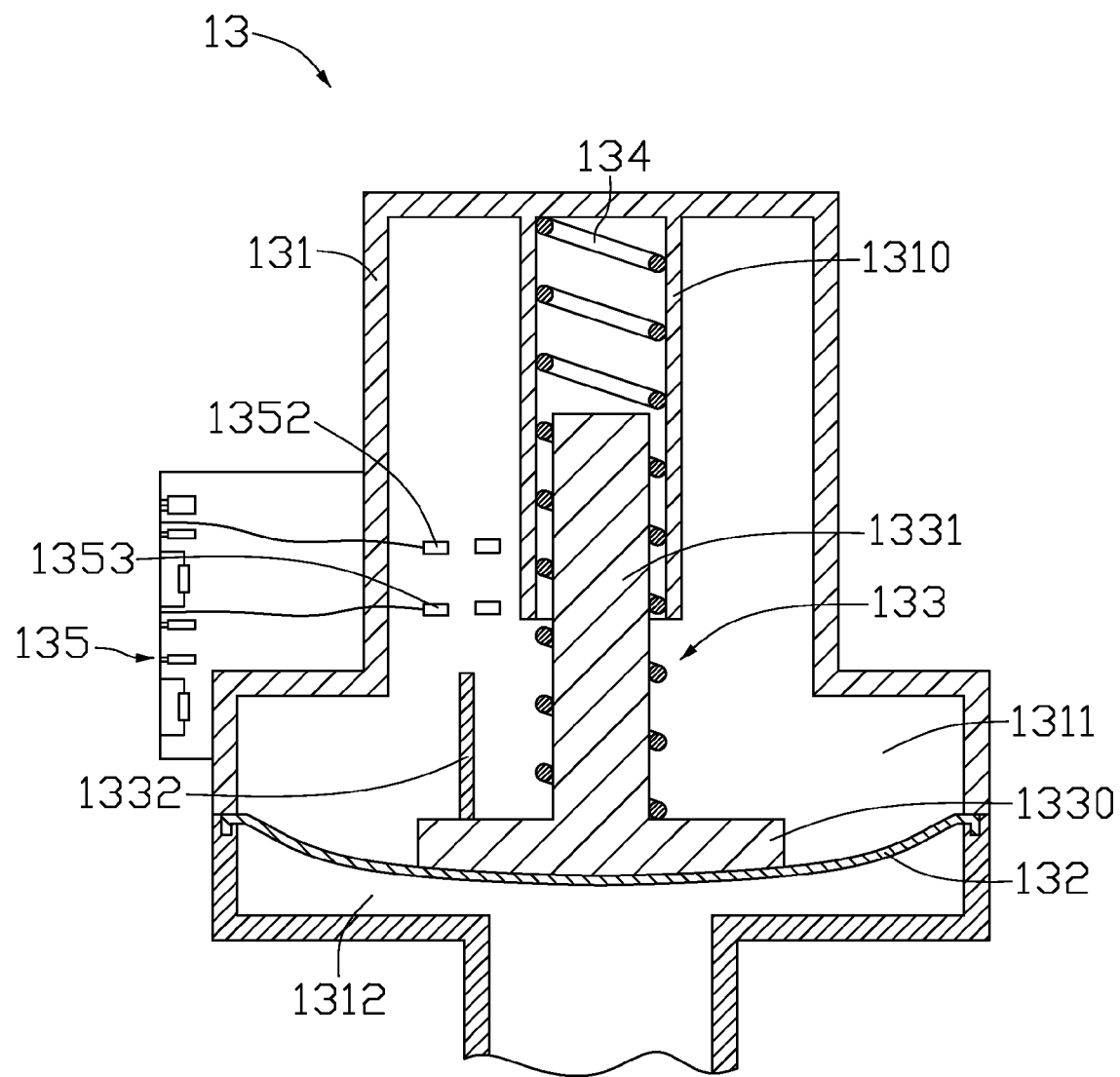
FIG. 3 is a cross-sectional view of a controlling module of the apparatus of FIG. 1.

Referring to FIG. 3, the controlling module 13 connects to the bi-directional pump 12 for controlling the bi-directional pump 12 to propel the liquid in the first direction or in the second direction according to a pressure of the liquid in the bi-directional pump 12. The controlling module 13 is preferably a pressure switch. The controlling module 13 includes a case 131, an elastic seal 132, a movable member 133, a resilient member 134, and a controlling circuit 135.

The case 131 is hollow and defines a cavity (not labeled) therein. A guide tube 1310 perpendicularly extends from a top surface of an inner wall of the case 131. The guide tube 1310 is configured for receiving one end of the resilient member 134.

The elastic seal 132 partitions the cavity of the case 131 into a sealed cavity 1311 and an open cavity 1312. The open cavity 1312 does not communicate with the sealed cavity 1311.

The movable member 133 is disposed in the sealed cavity 1311. The movable member 133 includes a flat bottom portion 1330, a guiding pole 1331, and an actuating piece 1332. The guiding pole 1331 and the actuating piece 1332 both perpendicularly extend from the bottom portion 1330. The guiding pole 1331 is disposed in the middle of the bottom portion 1330 and the actuating piece 1332 is disposed adjacent to the middle of the bottom portion 1330.

The resilient member 134 is a spring. An end of the resilient member 134 is received in the guide tube 1310 and an opposite end of the resilient member 134 is sleeved on the guiding pole 1331.

Figure 4:
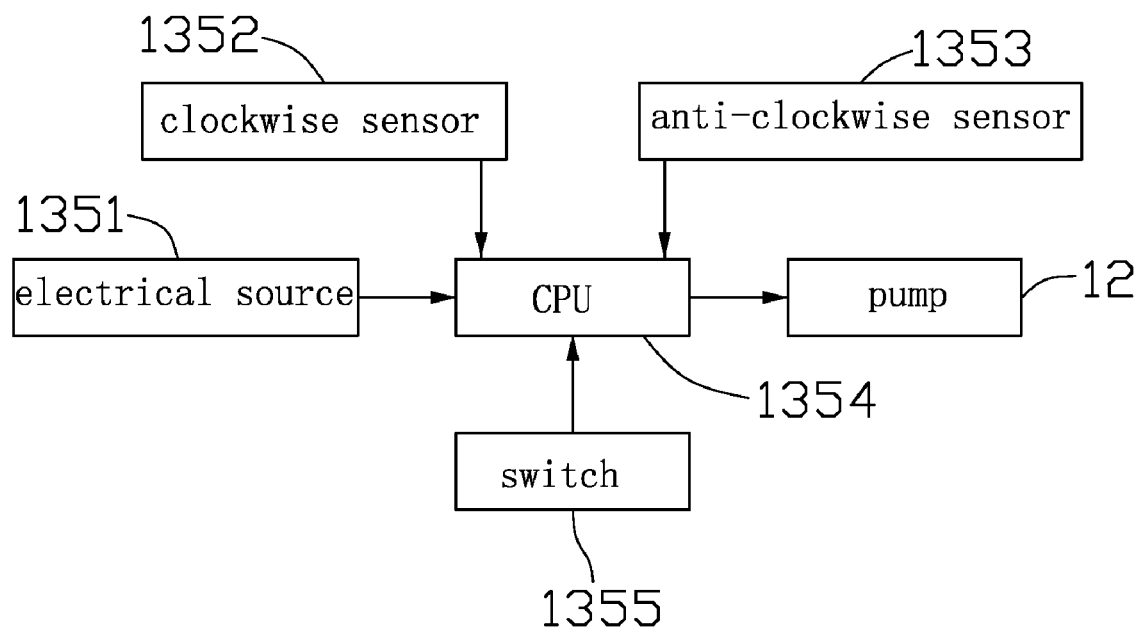
FIG. 4 is a working chart for showing the principle of the controlling module of FIG. 3.

Referring to FIG. 4, the controlling circuit 135 includes an electrical source 1351, a clockwise sensor 1352, an anti-clockwise sensor 1353, a central processing unit (CPU) 1354, and a switch 1355. The clockwise sensor 1352 and the anti-clockwise sensor 1353 are configured for detecting the position of the actuating piece 1332 of the movable member 133 and sending a signal corresponding to the position of the actuating piece 1332 of the movable member 133 to the CPU 1354. The CPU 1354 is configured for controlling the switch 1355, thereby controlling the bi-directional pump 12 to propel the liquid in the first direction or in the second direction according to the signal.

The clockwise sensor 1352 and the anti-clockwise sensor 1353 are disposed in the sealed cavity 1311 of the case 131. The clockwise sensor 1352 is disposed above the anti-clockwise sensor 1353. The change of the position of the actuating piece 1332 of the movable member 133 can change the signal received by the clockwise sensor 1352 and the anti-clockwise sensor 1353. Before the apparatus 10 works, the actuating piece 1332 of the movable member 133 is disposed between the anti-clockwise sensor 1353.

Referring to FIG. 1 through 4, to use the apparatus 10, the open cavity 1312 of the controlling module 13 communicates with the bi-directional pump 12. When the bi-directional pump 12 is enabled, the bi-directional pump 12 propels the liquid in the first direction, thereby drawing the liquid out of the hollow tub 112, through the tubes and into the container 20. The bi-directional pump 12 continues propelling the liquid in the first direction for a predetermined period of time, for example, two minutes. When the bi-directional pump 12 draws the liquid out of the hollow tub 112 efficiently, the liquid passes through the bi-directional pump 12, the liquid pressure in the bi-directional pump 12 will deform and push the elastic seal 132 outwards. As a result, the elastic seal 132 drives the actuating piece 1332 to a position beyond the clockwise sensor 1352 and the resilient member 134 becomes compressed. The clockwise sensor 1352 would detect the actuating piece 1332 and the controlling circuit 135 would send a first signal to the CPU 1354 indicating the position of the actuating piece 1332. The CPU 1354 will receive the first signal and interpret that the bi-directional pump 12 is drawing the liquid out efficiently and signals the bi-directional pump 12 to keep propelling the liquid in the first direction.

When the pump draws the liquid out inefficiently, i.e., when the through hole 1124 is clogged by debris of the buoyant pollutants, or when there is not enough liquid for the pump to create enough liquid pressure in the resilient member 134, the movable member 133 will be pulled inwards by the resilient member 134, and the actuating piece 1332 will return to the position between the anti-clockwise sensor 1353. The anti-clockwise sensor 1353 detects the change of the position of the actuating piece 1332 and sends a second signal to the CPU 1354. When the CPU 1354 receives the second signal, the CPU 1354 will control the switch 1355 to switch so that the bi-directional pump 12 turns to propel the liquid in the second direction. When the bi-directional pump 12 propels the liquid in the second direction, the liquid in the container 20 will be drawn into the hollow tub 112 from the through hole 1124 of the hollow tub 112 and the impurities adjacent to the through hole 1124 can be broken into pieces and spitted out of the hollow tub 112. When the bi-directional pump 12 propels the liquid in the second direction for a predetermined period of time, for example, two minutes, the CPU 1354 will control the pump 12 to propel the liquid in the first direction. After a predetermined period of time, the CPU 1354 decides whether the pump 12 should continue propelling the liquid in the first direction or not according to the signal of corresponding to the position of the actuating piece 1332 detected by the clockwise sensor 1352. Therefore, the apparatus 10 is less likely to be clogged by impurities for a long time.

In an alternative embodiment, the controlling module 13 includes an electromagnetic valve (not shown) and a pressure sensor (not shown). The bi-directional pump 12 is replaced by a mono-directional pump. An input hole of the pump is connected to the electromagnetic valve by a first flexible tube, an output hole of the pump is connected to the electromagnetic valve by a second flexible tube, an input tube and an output tube are also connected to the electromagnetic valve. The input tube communicates with the hollow tub 112 of the pollutant collecting device 11 and the output tube communicates with the container 20. The pressure sensor communicates with the pump for detecting the pressure of the liquid in the pump. The electromagnetic valve includes two working states and the working states can be exchanged according to the pressure of the liquid in the pump detected by the pressure sensor. In a first working state, the input tube communicates with the first flexible tube of the pump in the electromagnetic valve, and the output tube communicates with the second flexible tube in the electromagnetic valve. Thus, the pump can draw the liquid from the pollutant collecting device 11 into the container 20 in the first working state. In a second working state, the input tube communicates with the second flexible tube of the pump in the electromagnetic valve, and the output tube communicates with the first flexible tube in the electromagnetic valve. Thus, the pump can draw liquid from the container 20 into the pollutant collecting device 11 in the second working state.

If the pressure of the liquid in the pump detected by the pressure sensor is in a normal range, the electromagnetic valve continues working in the first state so that the pump draws liquid from the pollutant collecting device 11 into the container 20. If the pressure of the liquid in the pump detected by the pressure sensor is in an abnormal range, that is, the through hole 1124 of the hollow tub 112 is clogged by impurities, the electromagnetic valve will be turned to the second working state. The pump can draw liquid from the container 20 into the pollutant collecting device 11 to broke the impurities adjacent to the through hole 1124 into pieces and spitted out of the hollow tub 112.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An apparatus for removing buoyant pollutants having oil and debris atop a body of a coolant, the apparatus comprising:
 a pollutant collecting device including a hollow tub and a collecting module, the collecting module being partially received in the hollow tub and slidable relative to the hollow tub;
 a bi-directional pump communicating with the hollow tub; and
 a controlling module configured for controlling the bi-directional pump to draw coolant, oil or a mixture of coolant and buoyant pollutants into the hollow tub or out of the hollow tub;
 wherein the controlling module is a pressure switch connected to the bi-directional pump for controlling the bi-directional pump to propel a liquid of coolant, oil or a mixture of coolant and buoyant pollutants in a first direction or in a second direction opposite to the first direction according to a pressure of the liquid in the bi-directional pump; the controlling module comprises a case, an elastic seal, a movable member, a resilient member, and a controlling circuit; a sealed cavity and an open cavity defined in the case, and the elastic seal is disposed between the sealed cavity and the open cavity; the movable member is disposed in the sealed cavity and includes a bottom portion abutting the elastic seal and an actuating piece disposed on the bottom portion; a first end of the resilient member abuts the bottom portion, and a second end opposite to the first end of the resilient member abuts the case; the controlling circuit is configured for detecting the position of the actuating piece of the movable member and controlling the bi-directional pump to propel the liquid in the first direction or in the second direction according to the position of the actuating piece.

2. The apparatus as claimed in claim 1, wherein the controlling circuit comprises an electrical source, a clockwise sensor, an anti-clockwise sensor, a central processing unit, and a switch, the clockwise sensor and the anti-clockwise sensor are disposed in the sealed cavity for detecting the position of the actuating piece of the movable member and sending a signal corresponding the position of the actuating piece of the movable member to the central processing unit, the central processing unit is configured for controlling the switch, thereby controlling the bi-directional pump to propel the liquid in the first direction or in the second direction according to the signal.

3. The apparatus as claimed in claim 1, wherein the movable member further comprises a guiding pole disposed in the middle of the bottom portion; the case further comprises a guide tube extending from a top surface of an inner wall of the case, the first end of the resilient member is received in the guide tube and the second end of the resilient member is sleeved on the guiding pole.

4. The apparatus as claimed in claim 1, wherein the resilient member is a spring.

5. The apparatus as claimed in claim 1, wherein the hollow tub comprises a main portion and a platform base connected to one end of the main portion and a through hole defined in the main portion adjacent to the platform base, the through hole communicates with an input hole of the bi-directional pump.

6. The apparatus as claimed in claim 5, wherein the main portion is cylindrical.

7. The apparatus as claimed in claim 5, wherein the platform base includes a plurality of threaded holes defined therein, the apparatus further includes a plurality of adjusting members for engaging in the threaded holes of the platform base so that a height of the apparatus can be adjusted.

8. The apparatus as claimed in claim 5, wherein the platform base includes three threaded holes defined therein, and the apparatus further includes three screws for engaging in the threaded holes of the platform base so that a height of the apparatus can be adjusted.

9. The apparatus as claimed in claim 1, wherein the collecting module comprises a skimming member, a skimmer supporting cup, and a floating platform; and one end of the skimming member is attached in a top end of the skimmer supporting cup, and the floating platform is received in a bottom end of the skimmer supporting cup.

10. The apparatus as claimed in claim 9, wherein the skimming member is a funnel-shaped member, the skimming member includes a skimming portion and a mounting portion connected to the skimming portion; and the skimmer supporting cup is cylindrical, and the top end of the skimmer supporting cup engages with the mounting portion.

11. The apparatus as claimed in claim 9, wherein the floating platform is a hollow cylinder made of a solid buoyancy material.

12. The apparatus as claimed in claim 11, wherein the solid buoyancy material is foam polystyrene.

13. The apparatus as claimed in claim 1, wherein the bi-directional pump is a solenoid pump.

* * * * *